United States Patent
Koo

(10) Patent No.: US 6,310,464 B1
(45) Date of Patent: Oct. 30, 2001

(54) ELECTRIC CAR BATTERY CHARGING DEVICE AND METHOD

(75) Inventor: Jae-Seung Koo, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/457,213

(22) Filed: Dec. 7, 1999

(30) Foreign Application Priority Data

Jul. 8, 1999 (KR) .................................................. 99-27514

(51) Int. Cl.[7] ................................. H02J 7/00; H02J 7/04
(52) U.S. Cl. ................................................................. 320/149
(58) Field of Search ..................................... 320/106, 134, 320/149

(56) References Cited

U.S. PATENT DOCUMENTS

| | | | |
|---|---|---|---|
| 4,320,334 | * 3/1982 | Davis et al. | 340/636 |
| 4,668,901 | * 5/1987 | Furukawa | 320/149 |
| 4,678,999 | * 7/1987 | Schneider | 320/149 |
| 4,687,983 | * 8/1987 | Beyn | 320/149 |
| 4,709,202 | * 11/1987 | Koenck et al. | 320/149 |
| 5,321,627 | * 6/1994 | Reher | 702/63 |
| 5,545,969 | * 8/1996 | Hasegawa | 320/149 |
| 5,606,243 | * 2/1997 | Sakai et al. | 320/134 |
| 5,625,274 | * 4/1997 | Naskali | 320/149 |
| 5,717,256 | * 2/1998 | Okumura et al. | 307/66 |
| 5,739,671 | * 4/1998 | Hamada | 320/149 |
| 5,744,963 | * 4/1998 | Arai et al. | 320/149 |
| 5,844,884 | * 12/1998 | Szlenski | 320/149 |
| 5,894,413 | * 4/1999 | Ferguson | 363/65 |
| 6,023,151 | * 2/2000 | Hudson et al. | 320/135 |
| 6,025,695 | * 2/2000 | Friel et al. | 320/106 |

* cited by examiner

Primary Examiner—Peter S. Wong
Assistant Examiner—Pla Tibbits
(74) Attorney, Agent, or Firm—Christie, Parker & Hale, LLP

(57) ABSTRACT

Apparatus for charging the battery of an electric car. The apparatus comprising a battery charge controller, a battery charger, and a battery. The charge controller being capable of detecting the charge status of the battery, and upon detecting an under-charge condition of initializing, at any given time, a charging process wherein the battery is charged an expected charge amount which is dependant on the degree of under-charge initially detected by the charge controller. The charge controller upon termination of the charging process detects the actual charge amount and compares that amount to the expected charge amount and calculates a difference value. If the difference value exceeds a predetermined reference value, the controller charges the battery pack an additional predetermined amount.

4 Claims, 2 Drawing Sheets

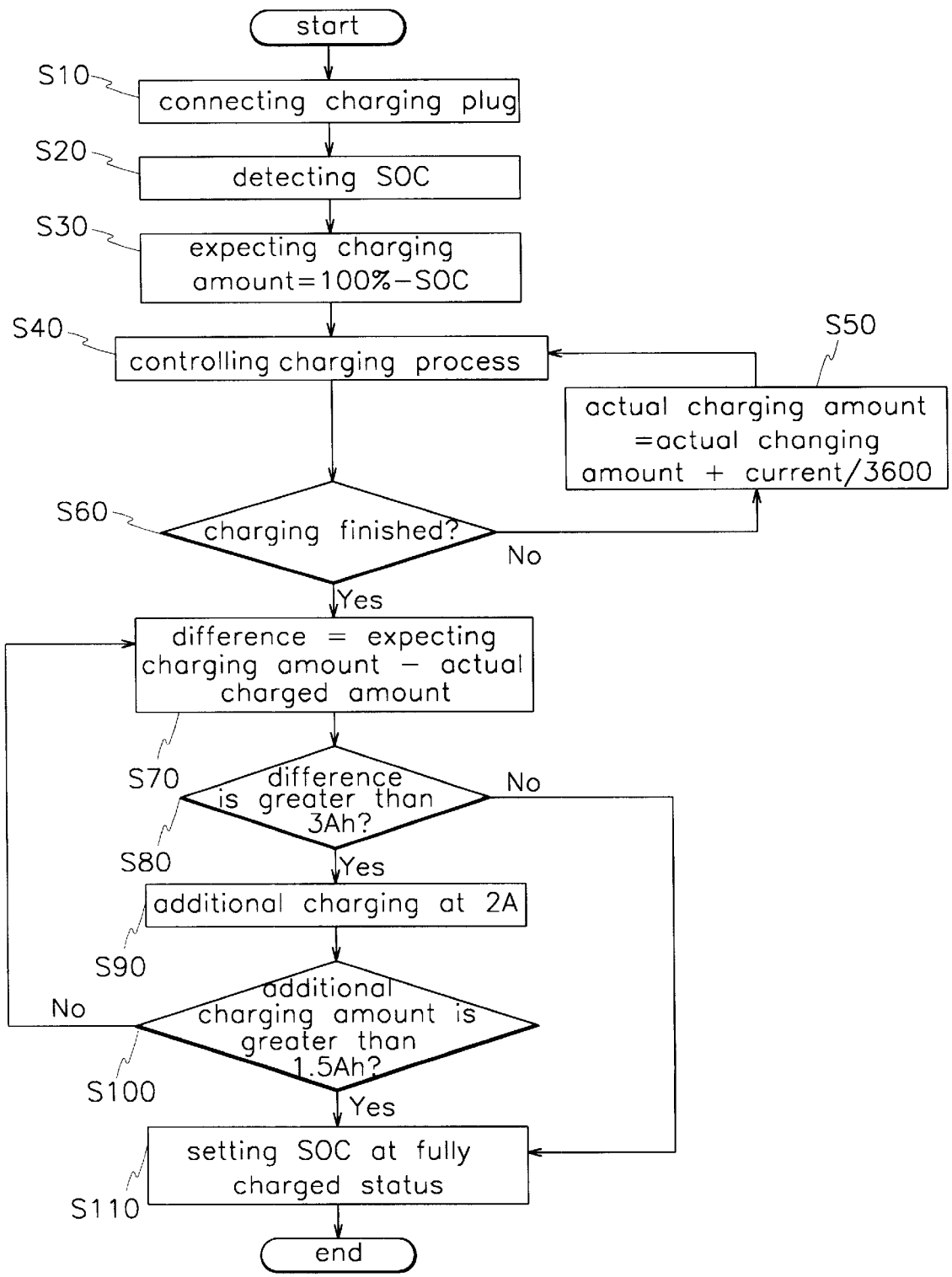

ELECTRIC CAR BATTERY CHARGING DEVICE AND METHOD

BACKGROUND OF THE INVENTION (a) Field of the Invention

The present invention relates to an electric car. More specifically, the present invention relates to a device and method for charging a battery of an electric car.

(b) Description of the Related Art

Different from an internal combustion engine driven car, an electric car moves using the limited energy of a battery comprised of modules. When the energy is exhausted, the battery must be charged with external power.

A state of charging (SOC) indicates a ratio of amount of usable current (or charge) over an induced (or charged) amount of current. The SOC of each module of the battery of the electric car varies depending on initial manufacture specifications, temperature and impedance of the modules, or the amount of continuous charging and discharging cycles.

A conventional battery charging method is divided into three modes. In the first constant power or CP mode, the battery is initially charged over a predetermined level of voltage using full power. In the second constant current or CC1 mode, the battery is charged with a 9 ampere (A) current. In the third CC2 mode, the battery is charged with a 4.5 A current.

However, when a car driver disconnects the charging plug during the charging process, or when the charging process is interrupted because of an abnormal power system condition, an undercharge occurs. An undercharge is also generated when the charging process is interrupted because of high internal resistance of the battery modules.

Therefore, the undercharge reduces capacity of the battery, and thereby, decreasing performance of the car.

SUMMARY OF THE INVENTION

It is an object of the present invention to provide a device and method for charging an electric car that detects a reduced capacity of the battery when the battery is not fully charged, and charges the battery as much as the reduced amount so as to increase the capacity and life of the battery.

In one aspect of the present invention, a battery charging device of an electric car comprises a battery pack that charges by receiving power and discharges to supply power; a battery charging controller that detects charging status of the battery in order to control a charging process, and after the charging process is finished and when a difference between an expected charging amount and an actual charged amount is over a reference value, charging the battery with a predetermined amount; and a battery charger for receiving external power according to the control of the battery charging controller, and for charging the battery.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 2 is a flow chart of a battery charging method according to a preferred embodiment of the present invention.

DETAILED DESCRIPTION OF THE PREFERRED EMBODIMENTS

Figure 1:
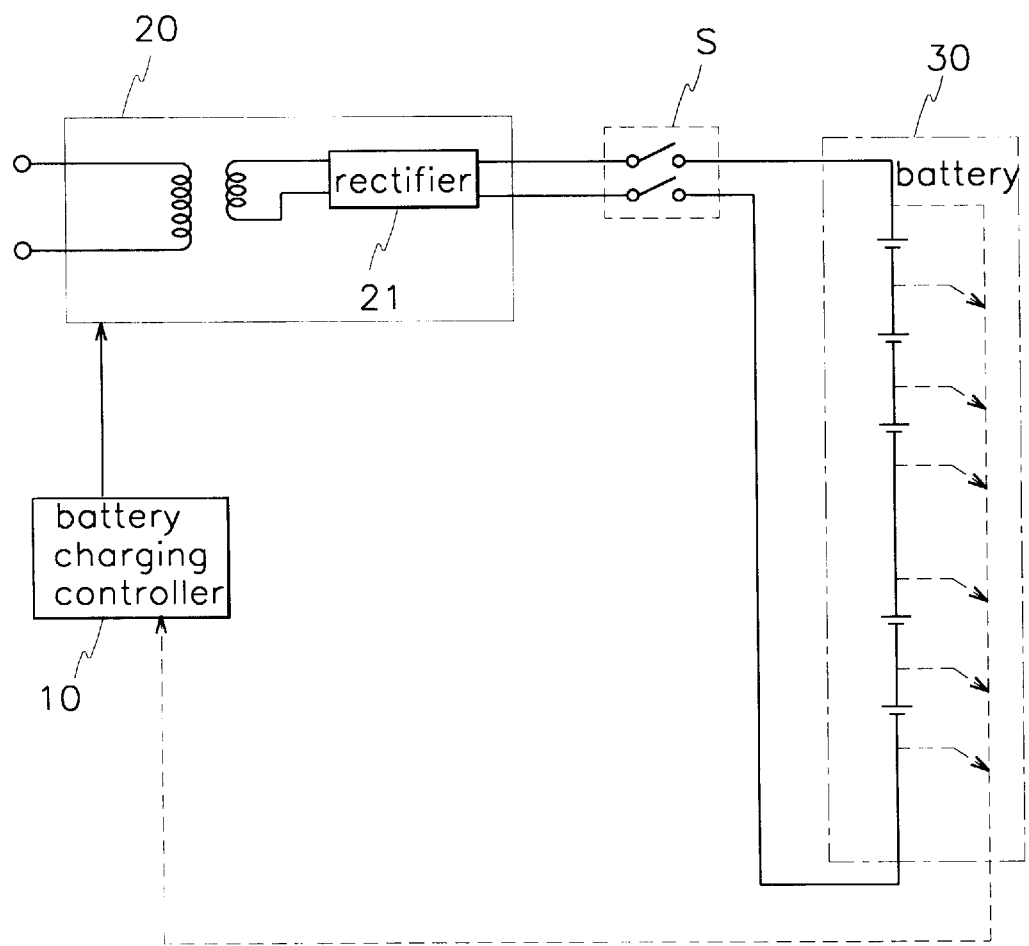
FIG. 1 is a schematic drawing of a battery charging device according to a preferred embodiment of the present invention.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

FIG. 1 is a schematic drawing of a battery charging device according to a preferred embodiment of the present invention.

As shown, the battery charging device of the electric car comprises a battery charging controller 10, a battery charger 20, and a battery pack 30.

The battery charging controller 10 checks the status of the battery pack 30, and outputs a control signal to charge the battery pack 30. The battery charger 20 converts externally supplied power into direct current (DC) power, and when a switch S is turned on, outputs an electrical signal to charge the battery pack 30.

Operation of the battery charging device of an electric car will now be described according to a preferred embodiment of the present invention referring to FIGS. 1 and 2.

FIG. 2 is a flow chart of a battery charging method according to a preferred embodiment of the present invention.

When a user is driving an electric car and the battery is discharged, the user stops the car and connects a plug to an alternating current (AC) power supply and turns on the switch S to charge the battery pack in step s10. The battery charging controller 10 then detects the initial charging status (SOCinitial) of the battery pack 30 in step s20, and sets an expected charging amount in step s30, and controls the battery charger 20 to charge the battery pack 30 in step s40.

External three phase AC power is converted into DC power through a rectifier 21, and the battery is charged by sequentially employing the CP mode using converted low power, the CC1 mode using a 9 A current, and the CC2 mode using a 4.5 A current.

Simultaneously, the battery charging controller 10 detects the charging status of the battery pack 30 in step s60.

In step s50, if the battery pack reaches a state of complete charge, the charging process is finished, and if not, the amount of energy that actually charges the battery pack is continuously totaled.

In the case of a normal charging completion, or when the charging process is finished while an undercharge state exists because one of the modules of the battery pack 30 has a high resistance or because of a power system abnormality, the battery charging controller 10 compares in step s70 the actual charged amount with the expected charging amount defined according to the SOCinitial value.

When the results of the comparison are greater than 3 ampere-hours (Ah), that is, a reference value, the battery charging controller 10 controls the battery charger 20 to charge the battery pack at a uniform 2 A current in step s90 in order for an additional charged amount to be greater than 1.5 Ah as per step s100. When the additional charged amount is greater than 1.5 Ah, the battery charger no longer charges the battery pack.

The battery charging controller 10 then sets an indication of the charging status of the battery pack 30 at a fully charged status (i.e., SOCfinal=100%) and the charging process is completed in step s110.

The present invention detects a decrease of capacity of the battery that occurs in the event of an undercharge of the battery and charges the battery as much as the reduced capacity so as to increase the capacity of the battery and its lifetime.

While this invention has been described in connection with what is presently considered to be the most practical and preferred embodiment, it is to be understood that the invention is not limited to the disclosed embodiments. On the contrary, this invention is intended to cover various modifications and equivalent arrangements included within the spirit and scope of the appended claims.

What is claimed is:

1. A battery charging device for an electric car comprising:

an electric car battery pack adapted to charge by receiving power and to discharge by supplying power;

an electric car battery charge controller;

an electric car battery charger for receiving external power, wherein the charger is interconnected with the charge controller and the battery pack and charges the battery pack under control of the charge controller;

an electric car battery charge controller capable of detecting the charge status of the battery pack, and upon detecting an under-charge condition of initializing, at any given time, a charging process wherein the battery pack is charged an expected charge amount, the expected charge amount being dependant on the degree of under-charge initially detected by the controller; and the charge controller, upon termination of the charging process, being further capable of detecting the actual charge amount and of comparing that amount to the expected charge amount and of calculating a difference value, wherein if the difference value exceeds a predetermined reference value, the controller charges the battery pack an additional predetermined amount.

2. The device of claim 1, wherein the device further comprises a switch that is turned on or off by a user so as to supply or stop external power.

3. An electric car having a rechargeable battery system:

an electric car;

an electric car battery pack adapted to charge by receiving power and to discharge by supplying power;

an electric car battery charge controller capable of detecting the charge status of the battery pack, and upon detecting an under-charge condition of initializing, at any given time, a charging process, wherein the battery pack is charged an expected charge amount, the expected charge amount being dependant on the degree of under-charge initially detected by the controller;

the charge controller, upon termination of the initial charging process, being further capable of detecting the actual charge amount and of comparing that amount to the expected charge amount and of calculating a difference value, wherein it the difference value exceeds a predetermined reference value, the controller charges the battery pack an additional predetermined amount; and an electric car battery charger for receiving external power, wherein the charger is interconnected with the charge controller and the battery pack and charges the battery pack under control of the charge controller.

4. A method for charging the battery of an electric car, comprising the steps of:

detecting an under-charge condition of a battery pack;

setting an expected charging amount according to the amount of under-charge, and charging the battery pack;

computing a difference between the expected charging amount and an actual charging amount charged to the battery after a charging process of the battery pack is finished;

further charging the battery a predetermined amount when the computed difference is greater than a reference value; and setting the charging status of the battery pack at a fully charged status and finishing the charging process when the computed difference is less than a reference value.

* * * * *